Figure 8:
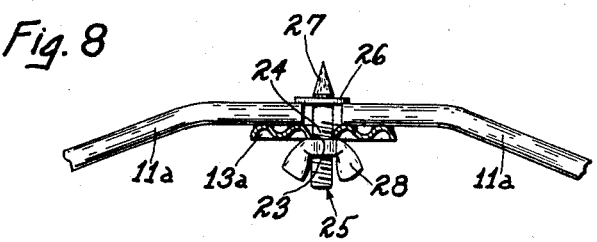

Oct. 13, 1959     D. L. COFFEEN     2,908,461
SUPPORTING DEVICE
Filed April 23, 1956     3 Sheets-Sheet 1
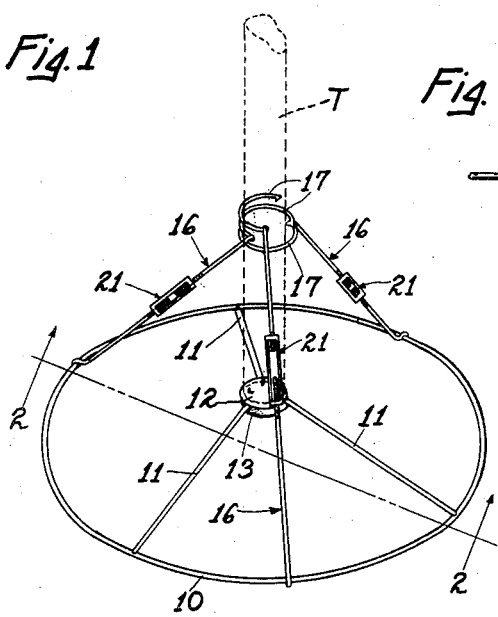
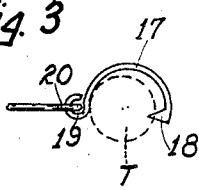
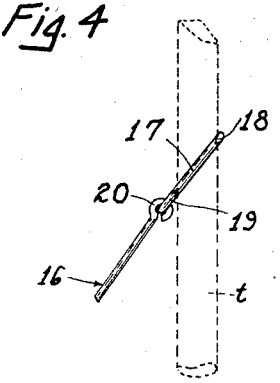
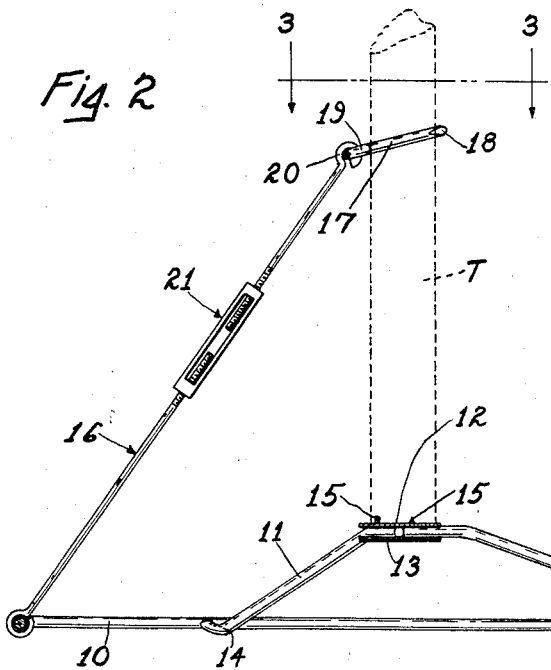
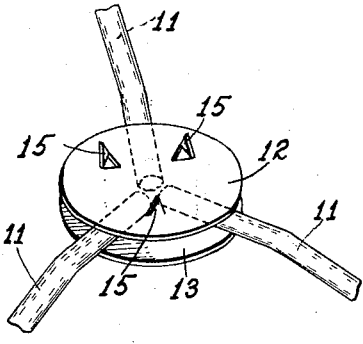
INVENTOR.
DAVIS L. COFFEEN
BY
*Michael Williams*
ATTORNEY Oct. 13, 1959     D. L. COFFEEN     2,908,461
SUPPORTING DEVICE Filed April 23, 1956     3 Sheets-Sheet 2

INVENTOR.
DAVIS L. COFFEEN
BY
ATTORNEY

Oct. 13, 1959  D. L. COFFEEN  2,908,461
SUPPORTING DEVICE

Filed April 23, 1956  3 Sheets-Sheet 3

INVENTOR.
DAVIS L. COFFEEN
BY
ATTORNEY

# United States Patent Office 2,908,461
Patented Oct. 13, 1959

2,908,461

SUPPORTING DEVICE

Davis L. Coffeen, Allison Park, Pa.

Application April 23, 1956, Serial No. 580,140

5 Claims. (Cl. 248—44)

The present invention relates to means for supporting generally upright bodies, more particularly to a device for holding Christmas trees and the like, and the principal object of the invention is to provide new and improved devices of the character described. This application is a continuation-in-part of application Serial Number 523,570 filed by the present applicant July 21, 1955 and entitled, Supporting Device. It is now abandoned.

While the present invention is hereinafter disclosed for use in supporting Christmas trees, it will readily be apparent that its use will not be limited to trees but that it may be used to support other bodies which may be employed in displays, theatrical sets and the like.

Of the many tree holders so far devised, few have achieved wide commercial success. In many instances, lack of success has resulted because the holder simply failed to hold the tree securely. Other constructions were expensive to manufacture and thus found only a very limited market and still others were troublesome and difficult to operate. The present invention overcomes the difficulties inherent in prior art constructions and its many advantages will readily become apparent from a study of the following description and from the drawing appended hereto.

Figure 9:
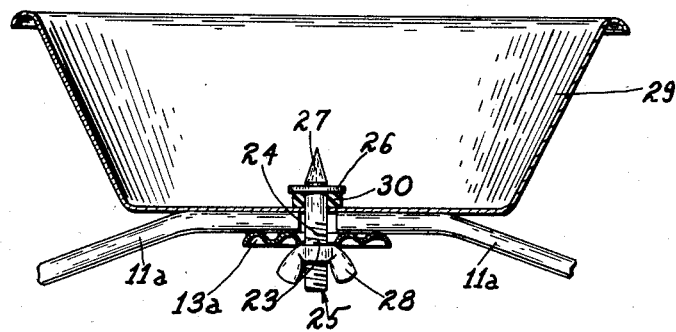
Figure 10:
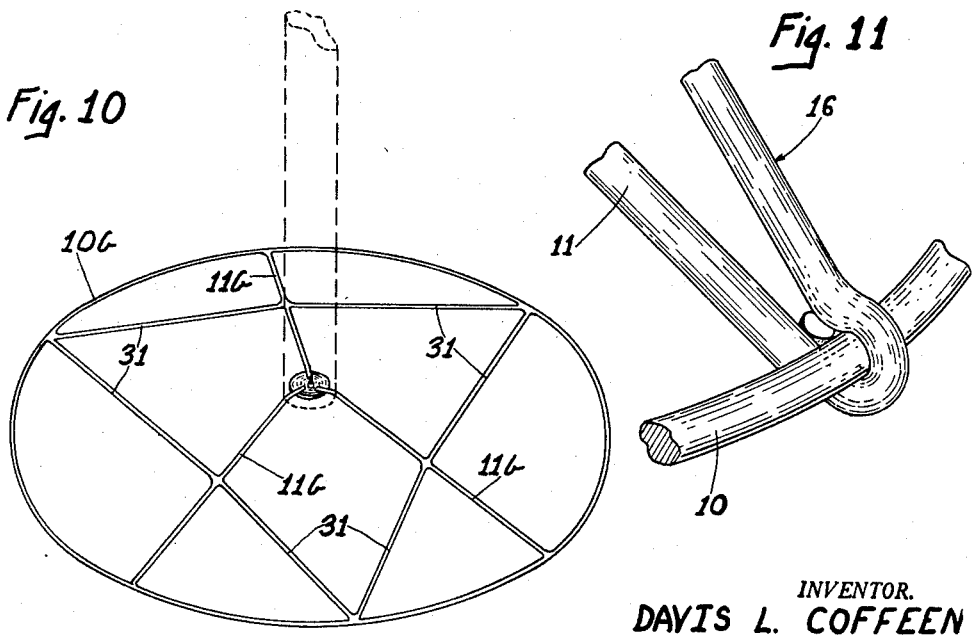
Figure 11:
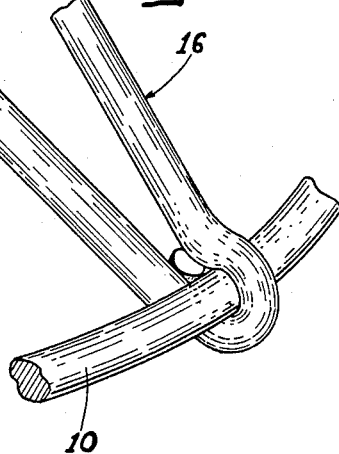
Figure 6:
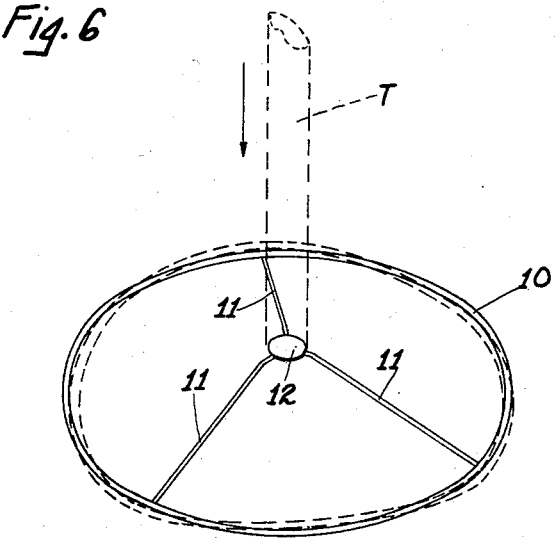
Figure 7:
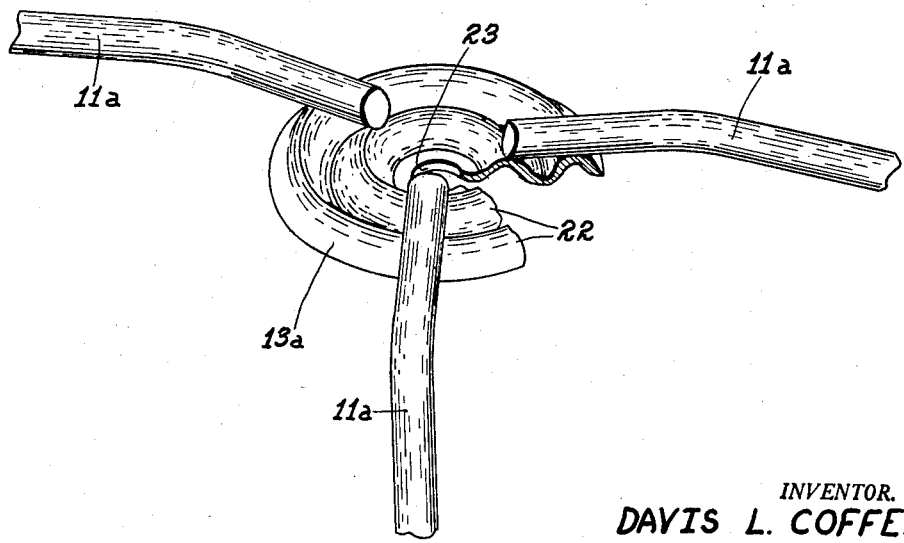

In the drawing accompanying this specification and forming a part of this application there is shown, for purpose of illustration, an embodiment which the invention may assume, and in this drawing:

Figure 1 is a perspective view of the invention in use,

Figure 2 is an enlarged sectional view of the invention generally corresponding to the line 2—2 of Figure 1, Figure 3 is a fragmentary plan view of a detail taken along the line 3—3 of Figure 2, Figure 4 is a fragmentary view similar to Figure 2 but showing how the device grips a tree smaller than that illustrated in Figure 2, Figure 5 is a further enlarged perspective view of another detail, Figure 6 is a view similar to Figure 1 but illustrating what occurs as the tree and the base are drawn together, certain parts shown in Figure 1 being omitted for simplicity, Figure 7 is an enlarged, fragmentary perspective view of another embodiment of the invention, Figure 8 is a reduced size sectional view, together with another detail, of the embodiment shown in Figure 7, Figure 9 is a view similar to Figure 8 but illustrating still another detail, Figure 10 is a perspective view of still another embodiment of the invention, and Figure 11 is an enlarged fragmentary perspective view similar to Figure 1 but showing certain parts in another position.

As best seen in Figure 1, the tree holder herein disclosed comprises a ring-like base member 10 presently formed of a suitable resilient rod whose ends are welded together. For trees of the size normally used in homes, it has been found that a base member two feet in diameter forms an adequate support. Extending upwardly and inwardly of the base member 10 are a plurality of legs 11 (herein shown to be three in number) which terminate at the center of the ring-like base member. The legs are joined together by means of plates 12 and 13 respectively welded to the legs above and below the point where they come together (see Figure 5). The other ends of the legs are secured, by welding or the like, to base member 10; each leg 11 preferably curving downwardly from the base (see Figure 2) prior to sloping upwardly toward the center to provide feet 14 forming a steady three-point support upon which the device rests. At the present time, it is preferable to form legs 11 of resilient rod material similar to that of which the ring-like base member is formed.

Plate 12 forms a support for the lower terminal portion of the tree T which is adapted to be held by the device and this plate is provided with a plurality of spaced-apart, upstanding barbs 15 (see Figure 5) which pierce the tree and prevent unintentional displacement of its lower end. At the present time, it is contemplated that barbs 15 will be formed by striking them out from plate 12; however, any other suitable expedient may be employed to provide the barbs.

Means are provided to steady the tree T and such means comprises a plurality of rods 16 (herein shown to be three in number) whose lower ends are looped about base 10 and whose upper ends are attachable to the tree. As will readily be apparent, each rod is shiftable to various positions about the base so that it may be positioned most advantageously to avoid the lower limbs of the tree.

Each rod 16 is preferably adapted to be attached to the tree at a point spaced above the latter's lower terminal portion by means of hooks 17 which are adapted to partially encircle the tree and which have one end provided with a barb 18 for penetrating the tree. The other end of each hook 17 has a loop 19 which is interengaged with a loop 20 formed in the upper end of respective rods 16 to thereby pivotally secure the hooks 17 to their respective rods. At the present time, it is preferable that each hook 17 be of a size to wrap around, or encircle at least one half of the trunk of the largest tree capable of being adequately supported by the device. With the hooks thus constructed and when they are pulled toward the base by rods 16, there will be no tendency for the hooks to rotate the tree thus tending to cause them to loosen their grip.

It will readily be apparent that while hooks 17 are particularly adapted to engage about the trunk of the tree, it may sometimes be desirable to engage one or more of the hooks about a lower limb of the tree instead.

Each rod 16 is adjustable in length for a purpose to appear; and, at the present time, each rod is formed of two pieces having adjoining ends threaded with opposite hand threads and joined together by means of a threaded member 21. This, it will be appreciated, forms a turn-buckle arrangement for adjusting the length of the rods 16.

In use, a tree T will be positioned vertically with its lower terminal portion resting on barbs 15 provided by plate 12. One of the hooks 17 will then be engaged with the tree at a point above its lower terminal portion (see Figure 3) and the respective rod 16 to which the one hook is attached will then be shortened, by means of the turnbuckle arrangement, until barb 18 of the hook penetrates the tree and the hook is tilted until the tree is wedged between opposite sides of the hook to securely lock the hook and the tree together. Note that the hooks 17 are equally effective in engaging small trees t, as illustrated in Figure 4. Since further shortening of this one rod 16 would tend to tilt the tree, this rod, at least for the time being, will be left in this position.

With the one rod 16 connected to the tree in the manner disclosed, the remaining rods will then, in turn, be connected thereto in a similar manner. With all three rods 16 connected to the tree, each may be further shortened to place the rods under tension and produce a resultant vertical force drawing the tree and the base tightly together.

It will readily be apparent that since the hooks are connected to the base by relatively rigid rods and since each hook is tilted to engage opposite sides of the tree, each hook alone will support the tree in two directions because of the fact that the rods may be stressed not only in tension but also in compression. Accordingly, although three hooks and their associated parts are herein shown, two of them would probably hold the tree with sufficient rigidity. Moreover, since one hook will hold the tree in two directions, connecting the hooks to the tree and adjusting the rods is a much easier operation than setting a tree upon many prior art stands wherein the tree is largely unsupported until the final setting-up operation has been completed.

Because each rod 16 is adjustable in length, it is a simple matter to adjust the three rods to not only securely hold the tree in upright position but also to hold the tree trunk in any desired angular position relative to a floor or other supporting surface. This would prove to be particularly advantageous in the event of supporting a tree with a crooked trunk. Under such circumstances, the lower portion of the tree could be supported in tilted relation so that the upper tree portion is supported vertically. The broad base 10 amply supports the tree against tipping and the three-point support formed by the feet 14 provide for a non-wobbling support even where the floor or other supporting surface is uneven.

Although not shown, it may be desirable to eleminate feet 14 by eliminating the curved portions of legs 11 which form such feet. In such event, it will be evident that the portions of rods 16 which are looped about the base ring will provide supporting feet.

It is an important feature of the present invention that the tree and the base are resiliently held together so that in the event of vibration, or shrinkage of the tree, little or no loosening will occur. As illustrated in Figure 6, tree T will be drawn in the direction of the arrow as rods 16 (not shown in this view) are shortened. This will move the adjoining center portions of legs 11 toward base ring 10 thus deflecting the legs and tending to reduce their upward slope and also forcing them radially outwardly. The radial outward movement of legs 11 will be resisted by the resilient base ring 10, which base ring will be distorted, as shown, to the dotted line position.

As illustrated, the portions of base ring 10 adjacent legs 11 will move radially outwardly while the connecting arcuate portions therebetween will move radially inwardly and tend to straighten out. This distortion of the resilient base ring 10 will be effected regardless of whether each rod 16 is positioned on base ring 10 at the mid point between respective adjoining legs 11 as illustrated in Figure 1 or whether each is positioned adjacent respective adjoining legs 11 as shown in Figure 11. Since, as before mentioned, while rods 16 may be variously positioned on the base ring to avoid interfering branches, it is preferable that, if at all possible, each rod 16 be positioned closely adjacent a respective leg 11 as shown in Figure 11 so as to eliminate pulling upwardly on the base ring portions intermediate legs 11. Pulling upwardly on the portions of the base ring intermediate the legs 11 might result in undesirable distortion of the base ring out of its normal plane in the event the rods 16 were tensioned excessively.

In the embodiment shown in Figure 7, upper plate 12 has been omitted and lower plate 13a has been formed to provide a pair of concentric, upwardly directed annular ridges 22 to which legs 11a (similar to legs 11 of the embodiment shown in Figure 1) are welded. Plate 13a has a central aperture 23 for a purpose to be disclosed.

As shown in Figure 8, the aperture in plate 13a is adapted to pass the threaded shank portion 24 of a stud 25 having a radially enlarged shoulder portion 26, which is adapted to overlie the adjoining portions of legs 11a, and a pointed end portion 27 which projects above legs 11a. The stud is maintained assembled with the base by means of a wing nut 28 and, as will be understood, the lower terminal portion of the tree is adapted to be impaled on the pointed end 27 of the stud to insure against displacement of the lower portion of the tree.

It is sometimes desirable to maintain the lower terminal portion of the tree immersed in water so that the tree will remain fresh for a longer period of time. For this purpose, a pan adapted to be filled with water is provided. As shown in Figure 9, a pan 29 is adapted to rest upon the adjoining portions of legs 11a. This pan has a central aperture which passes shank portion 24 of stud 25 and the pan is easily assembled with the base merely by removing stud 25 from the base, positioning pan 29 on legs 11a, and re-installing stud 25. In order to effect a watertight seal between the pan and the stud, a rubber washer, or gasket 30, is positioned on the stud between the bottom of the pan and shoulder 26 of the stud. Clearly, as wing nut 28 is tightened, gasket 30 will be compressed to provide a watertight seal.

The embodiment of the invention shown in Figure 10 is similar to those heretofore disclosed; however, this embodiment employs additional bracing for the ring-like base member 10b. As illustrated, such bracing presently comprises a pair of strut members 31, arranged in the form of a V, positioned between legs 11b. The apex of each V is welded or otherwise secured to the base member intermediate respective legs 11b and the other end of each strut 31 is welded or otherwise secured to the adjoining legs 11b.

This construction greatly strengthens the ring-like member and is particularly appropriate when the base member is greater than about three feet in diameter for adequately supporting larger trees. Although omitted from the drawing in the interest of simplicity, the embodiment shown in Figure 10 will also include means similar to that shown in Figure 1 for drawing the tree to the base.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A device for holding the trunk of a tree and the like in upright position, comprising a base ring, rigid spokes secured to said ring at spaced intervals and each extending inwardly to the axis of said ring, the inner ends of said spokes being connected and providing a support upon which the lower extremity of the tree trunk may rest, and tension means connected to said ring and adapted to be disposed between said ring and a lower portion of the tree trunk comprising a plurality of spaced bracing elements each having its lower end connected to said ring and an upper end for connection to said tree trunk, each bracing element including a pair of longitudinally aligned oppositely threaded members connected by an internally threaded sleeve, whereby said threaded members may be selectively lengthened and shortened, the upper end of each bracing member having a hook pivotally secured thereto, each hook being of a size to partially encircle the tree trunk and having a pointed terminal end to impale the tree.

2. The construction according to claim 1 wherein a plate is rigidly connected to the inner ends of said spokes and joins the same, and a water pan supported on the connection.

3. The construction according to claim 1 wherein a plate is rigidly connected to the inner ends of said spokes and joins the same, a water pan is supported on the connection, and a securing stud passing through the connection and through a hole in the bottom of said water pan, said stud having an upper pointed end upon which the lower extremity of the tree trunk is to be impaled to hold it against lateral displacement.

4. A device for holding upright the trunk of a tree and the like, comprising a resilient ring formed of rod material, rigid spokes of rod material secured to said ring at spaced intervals and each extending inwardly to the axis of said ring, a supporting plate rigidly secured to the inner ends of said spokes and carrying a vertically extending pointed member upon which the lower extremity of the tree trunk is to be impaled to hold it against lateral displacement, and tension means adapted to be disposed between said ring and a lower portion of the tree trunk, said tension means comprising a plurality of rigid rod members each including a pair of oppositely threaded rod sections connected by an internally threaded member whereby said rod members may be selectively lengthened and shortened, the lower end of each rigid rod member being loosely connected to said ring for shifting movement along the latter so as to enable said rod members to be positioned at selected intervals along said ring.

5. A device for holding upright the trunk of a tree and the like, comprising a resilient ring formed of rod material, rigid spokes of rod material secured to said ring at spaced intervals and each extending inwardly to the axis of said ring, a supporting plate rigidly secured to the inner ends of said spokes and carrying a vertically extending pointed member upon which the lower extremity of the tree trunk is to be impaled to hold it against lateral displacement, and tension means adapted to be disposed between said ring and a lower portion of the tree trunk comprising a plurality of rigid rod members each having a lower end connected to said ring and an upper end having a hook pivotally secured thereto, each hook being of a size to partially encircle the tree trunk and having a pointed terminal end to impale the tree, and each rod member including a pair of oppositely threaded rod sections connected by an internally threaded member whereby said rod members may be selectively lengthened and shortened.

References Cited in the file of this patent

UNITED STATES PATENTS

| | | |
|---|---|---|
| 1,057,268 | Phillips | Mar. 25, 1913 |
| 1,463,734 | Ullrich | July 31, 1923 |
| 1,481,015 | Klein | Jan. 15, 1924 |
| 1,540,025 | Lemay | June 2, 1925 |
| 1,762,740 | Rains | June 10, 1930 |
| 1,799,513 | Hill | Apr. 7, 1931 |
| 2,503,446 | MacLatchie | Apr. 11, 1940 |
| 2,621,878 | Kruger | Dec. 16, 1952 |
| 2,689,701 | Whitaker | Sept. 21, 1954 |
| 2,755,050 | Ford | July 17, 1956 |